US011319814B2

(12) United States Patent
Auxier et al.

(10) Patent No.: US 11,319,814 B2
(45) Date of Patent: May 3, 2022

(54) MANUFACTURING THIN-WALLED CASTINGS UTILIZING ADAPTIVE MACHINING

(71) Applicant: United Technologies Corporation, Farmington, CT (US)

(72) Inventors: James Tilsley Auxier, Bloomfield, CT (US); Norman W. Cofalka, Lewes, DE (US); Alan C. Barron, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 311 days.

(21) Appl. No.: 16/403,208

(22) Filed: May 3, 2019

(65) Prior Publication Data

US 2020/0347729 A1 Nov. 5, 2020

(51) Int. Cl.
B23P 15/02 (2006.01)
B23P 15/04 (2006.01)
(Continued)

(52) U.S. Cl.
CPC .............. *F01D 5/14* (2013.01); *B22D 25/02* (2013.01); *B23P 15/00* (2013.01); *B23P 15/02* (2013.01); *B23P 15/04* (2013.01); *B33Y 10/00* (2014.12); *B33Y 50/02* (2014.12); *B33Y 80/00* (2014.12); *F01D 5/141* (2013.01); *B23P 13/02* (2013.01); *B23P 2700/01* (2013.01); *F02C 3/04* (2013.01); *F02C 3/14* (2013.01); *F02C 7/36* (2013.01); *F02C 9/18* (2013.01); *F05D 2220/32* (2013.01); *F05D 2230/10* (2013.01); *F05D 2230/211* (2013.01); *F05D 2230/31* (2013.01); *F05D 2240/20* (2013.01)

(58) Field of Classification Search
CPC ........... B23P 13/02; B23P 15/00; B23P 15/02; B23P 15/04; B33Y 10/00; B33Y 50/02; B33Y 80/00; F05D 2230/10; F05D 2230/211; F05D 2230/31
See application file for complete search history.

(56) References Cited

U.S. PATENT DOCUMENTS 9,555,470 B1 * 1/2017 Heneveld ................. F01D 5/147
2007/0023112 A1 * 2/2007 Campbell ............. F04D 29/284
148/577

FOREIGN PATENT DOCUMENTS

FR 2890879 A1 3/2007

OTHER PUBLICATIONS

European Search Report Application No. EP20172602; dated Sep. 7, 2020; p. 11.

(Continued)

*Primary Examiner* — Jermie E Cozart
(74) *Attorney, Agent, or Firm* — Cantor Colburn LLP

(57) ABSTRACT

A method of manufacturing a casting is provided and includes establishing desired dimensions of a nominal casting, executing a casting process to produce multiple actual castings with each of the multiple actual castings having respective dimensions that differ from each other and from the desired dimensions of the nominal casting and engaging one or more tools to adaptively machine, without rigidly-programmed toolpaths, each of the multiple actual castings to reduce the respective differences between the actual dimensions of each of the multiple actual castings and the desired dimensions.

13 Claims, 7 Drawing Sheets

(51) Int. Cl.
    *B33Y 10/00*     (2015.01)
    *B33Y 50/02*     (2015.01)
    *B33Y 80/00*     (2015.01)
    *B22D 25/02*     (2006.01)
    *B23P 15/00*     (2006.01)
    *F01D 5/14*     (2006.01)
    *F02C 3/04*     (2006.01)
    *F02C 3/14*     (2006.01)
    *F02C 7/36*     (2006.01)
    *F02C 9/18*     (2006.01)
    *B23P 13/02*     (2006.01)

(56) References Cited

OTHER PUBLICATIONS

Jian Gao, et al.: "An Intergrated Adaptive Repai Solution for Complex Aerospace Components Through Geometry Reconstructions", The International Journal of Adivanced Manufacturing Technology, Springer, Berlin, DE, vol. 36, No. 11-12, Feb. 3, 2007 XP019583787 issn: 1433-3015; pp. 1170-1179.

* cited by examiner

MANUFACTURING THIN-WALLED CASTINGS UTILIZING ADAPTIVE MACHINING

BACKGROUND

Exemplary embodiments of the present disclosure relate generally to manufacturing castings and, in one embodiment, to methods of manufacturing think-walled castings utilizing adaptive machining.

Many aerospace components such as turbine airfoils, in particular, are manufactured by utilizing lost-wax investment casting processes. These processes typically involve an injection of molten wax into a cavity that is formed by a wax die or tool where the molten wax solidifies and creates a positive wax shape of the intended component.

In lost-wax investment casting processes there is often at least one ceramic or refractory metal core that is placed within the wax tool before injection. This ceramic or metal core is then at least partially enveloped in the wax during the injection process. Following shelling, the wax is melted out of the cavity formed by the shell, leaving the ceramic or metal core within the cavity (hence, lost wax).

There are several limitations that presently control how thin a wax wall may be created during investment casting (notwithstanding any part design limitations). The limitations include tolerance stack of wax tools, core position, and core thickness, filling capability of the molten wax into the wax die, structural rigidity of the wax to survive the shelling process and filling capability of the molten alloy into the shell's wall cavities. These limitations can result in wax walls that are thicker than an optimized part design would tend to prefer.

BRIEF DESCRIPTION

According to an aspect of the disclosure, a method of manufacturing a casting is provided and includes establishing desired dimensions of a nominal casting, executing a casting process to produce multiple actual castings with each of the multiple actual castings having respective dimensions that differ from each other and from the desired dimensions of the nominal casting and engaging one or more tools to adaptively machine, without rigidly-programmed toolpaths, each of the multiple actual castings to reduce the respective differences between the actual dimensions of each of the multiple actual castings and the desired dimensions.

In accordance with additional or alternative embodiments, the actual dimensions of each of the multiple castings exceed or are less than the desired dimensions.

In accordance with additional or alternative embodiments, the nominal casting has a size and shape of a turbine airfoil and each of the multiple actual castings has a trailing edge which is at least one of thicker than and offset from a trailing edge of the nominal casting.

In accordance with additional or alternative embodiments, the nominal casting has a size and shape of a turbine airfoil and each of the multiple actual castings has an irregular trailing edge which is thicker than a trailing edge of the nominal casting.

In accordance with additional or alternative embodiments, the nominal casting has a size and shape of a turbine airfoil and each of the multiple actual castings has a trailing edge which is at least one of canted and bowed as compared to a trailing edge of the nominal casting.

In accordance with additional or alternative embodiments, the engaging of the one or more tools, without rigidly-programmed toolpaths, includes engaging a cutting tool to reduce the actual dimensions of each of the multiple actual castings exceeding the desired dimensions and engaging an additive manufacturing tool to increase the actual dimensions of each of the multiple castings that are less than the desired dimensions.

In accordance with additional or alternative embodiments, the engaging of the one or more tools, without rigidly-programmed toolpaths, includes preparing the one or more tools for executions of adaptive machining and executing the adaptive machining in accordance with the preparing.

In accordance with additional or alternative embodiments, the preparing of the one or more tools includes importing net-state models of the nominal casting and creating three-dimensional scans of exemplary workpieces, identifying registration, best-fit point and surface references, creating an index of features to identify and setting adaptive machining rules.

In accordance with additional or alternative embodiments, the executing of the adaptive machining includes scanning each of the multiple actual castings, creating difference maps between the nominal casting and each of the multiple actual castings in accordance with the registration, best-fit point and surface references, defining subtractive or additive operations relative to each of the multiple actual castings in accordance with the index of features and programming the one or more tools to execute the subtractive or additive operations in accordance with the adaptive machining rules.

In accordance with additional or alternative embodiments, the executing is deliberately executed such that the actual dimensions of each of the multiple castings differ from the desired dimensions in a manner that is correctable by the one or more tools.

According to aspects of the disclosure, a computer-implemented method of manufacturing a casting is provided and includes establishing desired dimensions of multiple portions of a nominal turbine airfoil casting, executing a casting process to produce multiple actual turbine airfoil castings, each of the multiple actual turbine airfoil castings having respective actual dimensions at multiple portions thereof that exceed or are less than the desired dimensions of the multiple portions of the nominal turbine airfoil casting and engaging one or more tools to adaptively machine, without rigidly-programmed toolpaths, each of the multiple actual turbine airfoil castings to reduce the respective differences between the actual dimensions at the multiple portions of each of the multiple actual turbine airfoil castings and the desired dimensions of the multiple portions.

In accordance with additional or alternative embodiments, one of the multiple portions of the nominal turbine airfoil casting is a trailing edge thereof and one of the desired dimensions is a thickness thereof, one of the multiple portions of each of the multiple actual turbine airfoil castings is a trailing edge thereof and one of the actual dimensions is a thickness thereof and the thickness of the trailing edge of each of the multiple actual turbine airfoil castings is at least one of thicker than and offset from the trailing edge of the nominal turbine airfoil casting.

In accordance with additional or alternative embodiments, one of the multiple portions of the nominal turbine airfoil casting is a trailing edge thereof and one of the desired dimensions is a thickness thereof, one of the multiple portions of each of the multiple actual turbine airfoil castings is an irregular trailing edge thereof and one of the actual dimensions is a thickness thereof and the thickness of the irregular trailing edge of each of the multiple actual turbine airfoil castings is thicker than the trailing edge of the nominal turbine airfoil casting.

In accordance with additional or alternative embodiments, one of the multiple portions of the nominal turbine airfoil casting is a trailing edge thereof and one of the desired dimensions is at least one of a canting and bowing thereof, one of the multiple portions of each of the multiple actual turbine airfoil castings is a trailing edge thereof and one of the actual dimensions is at least one of a canting and a bowing thereof and the at least one of the canting and the bowing of the trailing edge of each of the multiple actual turbine airfoil castings differs from the at least one of the canting and the bowing of the trailing edge of the nominal turbine airfoil casting.

In accordance with additional or alternative embodiments, the engaging of the one or more tools, without rigidly-programmed toolpaths, includes engaging a cutting tool to reduce the actual dimensions of each of the multiple actual turbine airfoil castings exceeding the desired dimensions and engaging an additive manufacturing tool to increase the actual dimensions of each of the multiple actual turbine airfoil castings that are less than the desired dimensions.

In accordance with additional or alternative embodiments, the engaging of the one or more tools, without rigidly-programmed toolpaths, includes preparing the one or more tools for executions of adaptive machining and executing the adaptive machining in accordance with the preparing.

In accordance with additional or alternative embodiments, the preparing of the one or more tools includes importing net-state models of the nominal turbine airfoil casting and creating three-dimensional scans of exemplary workpieces, identifying registration, best-fit point and surface references, creating an index of features to identify and setting adaptive machining rules.

In accordance with additional or alternative embodiments, the executing of the adaptive machining includes scanning each of the multiple actual turbine airfoil castings, creating difference maps between the nominal turbine airfoil casting and each of the multiple actual turbine airfoil castings in accordance with the registration, best-fit point and surface references, defining subtractive or additive operations relative to each of the multiple actual turbine airfoil castings in accordance with the index of features and programming the one or more tools to execute the subtractive or additive operations in accordance with the adaptive machining rules.

In accordance with additional or alternative embodiments, the executing is deliberately executed such that the actual dimensions of each of the multiple actual turbine airfoil castings differ from the desired dimensions in a manner that is correctable by the one or more tools.

According to aspects of the disclosure, a computer-implemented method of manufacturing a casting is provided and includes establishing desired dimensions of multiple portions of a nominal turbine airfoil casting, executing casting processes to produce multiple actual turbine airfoil castings, each of the multiple actual turbine airfoil castings having respective actual dimensions at multiple portions thereof that exceed or are less than the desired dimensions of the multiple portions of the nominal turbine airfoil casting and engaging one or more tools to adaptively machine, without rigidly-programmed toolpaths, the multiple actual turbine airfoil castings to reduce the respective differences between the actual dimensions of each of the multiple actual turbine airfoil castings at the multiple portions and the desired dimensions of the multiple portions. The executing includes determining how the actual dimensions of each of the multiple actual turbine airfoil castings could differ from the desired dimensions in a manner that is correctable by the one or more tools and deliberately executing the casting processes of each of the multiple actual turbine airfoil castings such that the actual dimensions of each of the multiple actual turbine airfoil castings differ from the desired dimensions in the manner that is correctable by the one or more tools.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
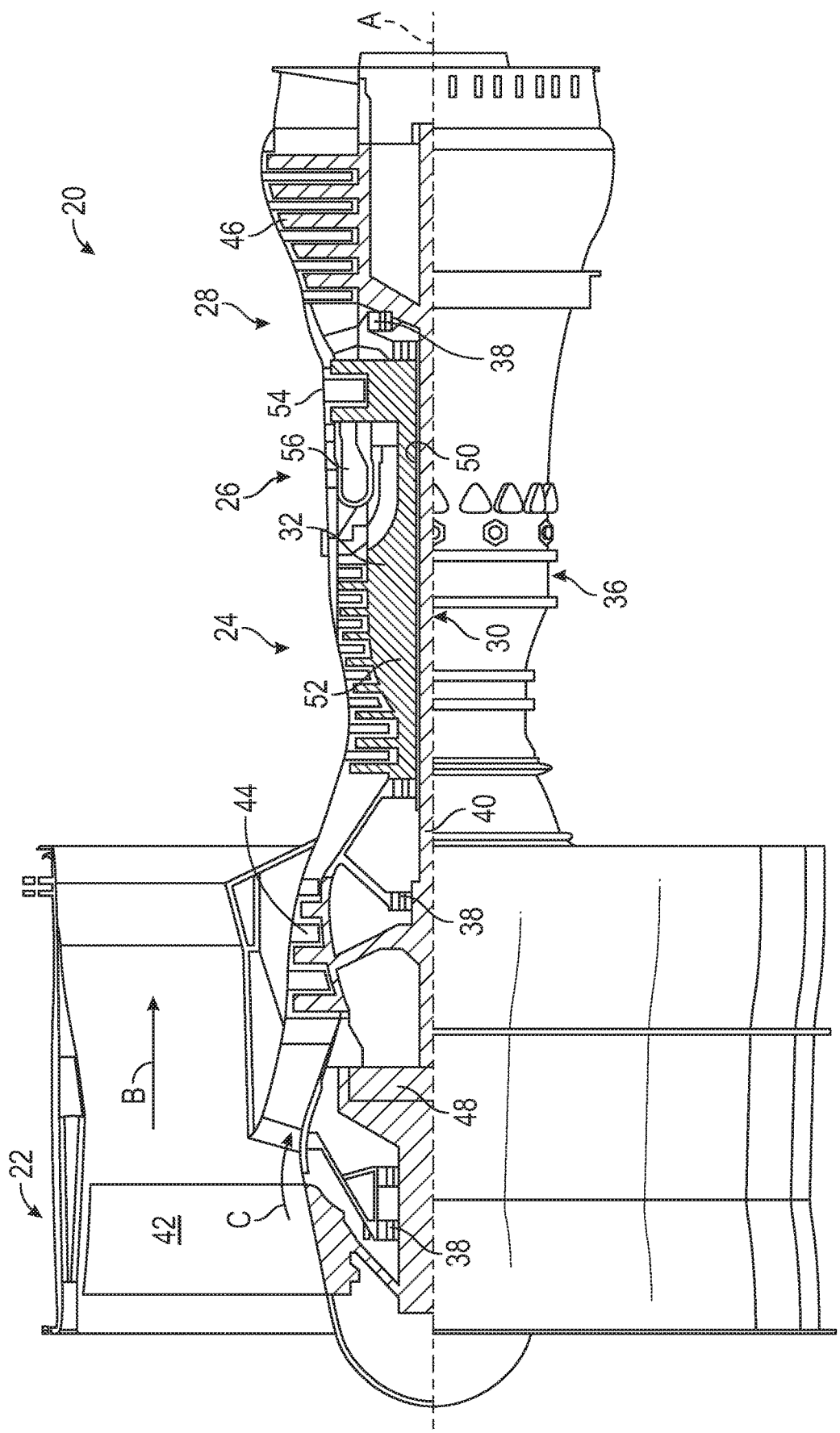
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{R})/(518.7^\circ \text{R})]^{0.5}$. The "Low corrected fan tip speed" as disclosed herein according to one non-limiting embodiment is less than about 1150 ft/second (350.5 m/sec).

As will be described below, a method of manufacturing is provided that produces a wax wall that is thicker than nominal and utilizes adaptive machining during casting dressing to restore nominal wall thicknesses and profiles. The banding may take various shapes to best fit the application, including spanners for added structural rigidity during shelling/casting or other items.

Figure 2:
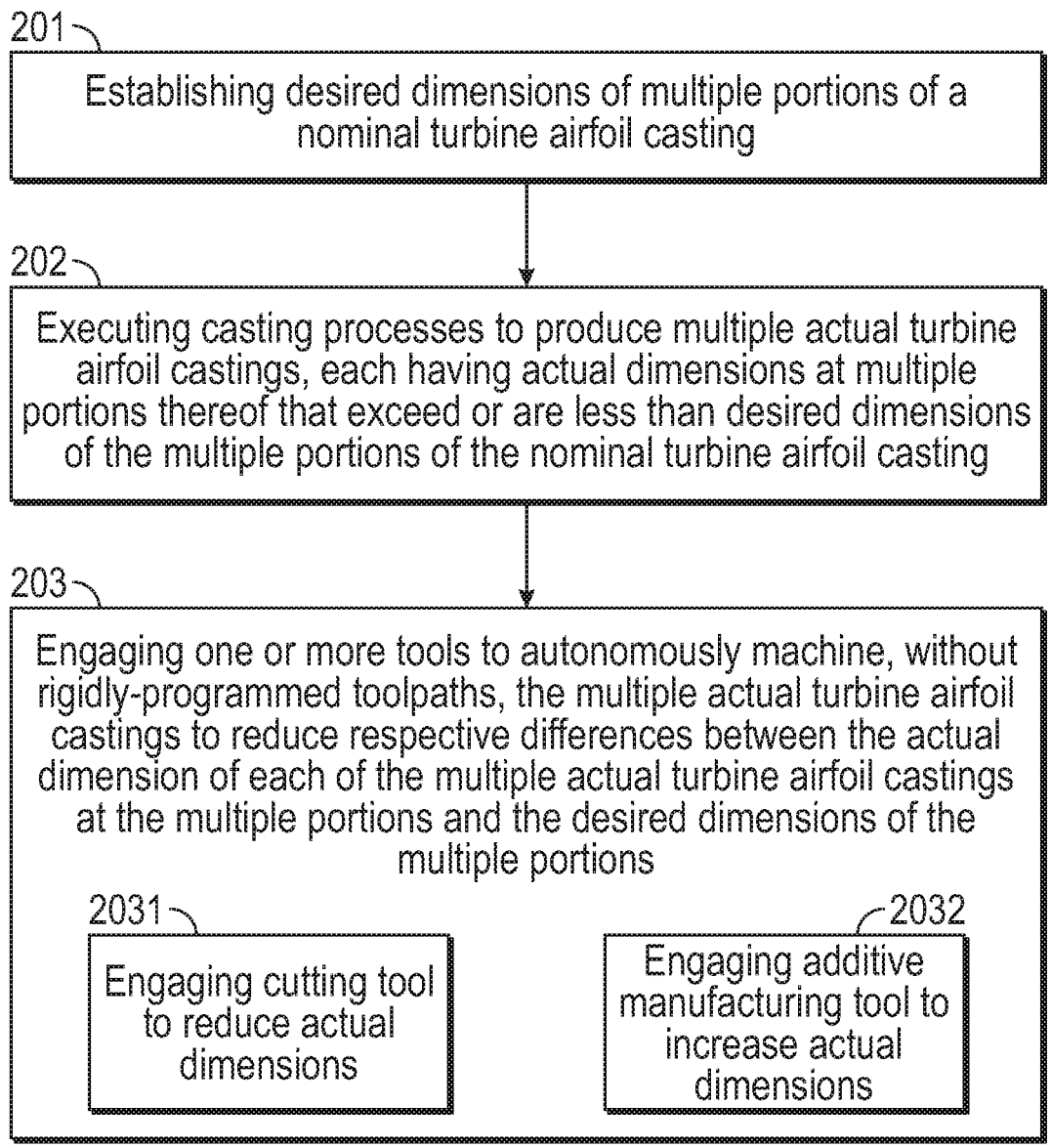
FIG. 2 is a flow diagram illustrating a method of manufacturing a thin-walled casting in accordance with embodiments.

With reference to FIG. 2, a method of manufacturing a thin-walled casting is provided. The method includes establishing desired dimensions of multiple portions of a nominal turbine airfoil casting 201. The method also includes executing casting processes to produce multiple actual turbine airfoil castings where each of the multiple actual turbine airfoil castings has actual dimensions at multiple portions thereof that fall inside or outside of the desired dimensions of the multiple portions of the nominal turbine airfoil casting 202. In addition, the method includes engaging one or more tools to adaptively machine, without rigidly-programmed toolpaths, each of the multiple actual turbine airfoil castings to reduce respective differences between the actual dimensions of each of the multiple actual turbine airfoil castings at the multiple portions and the desired dimensions of the multiple portions 203.

Figure 3:
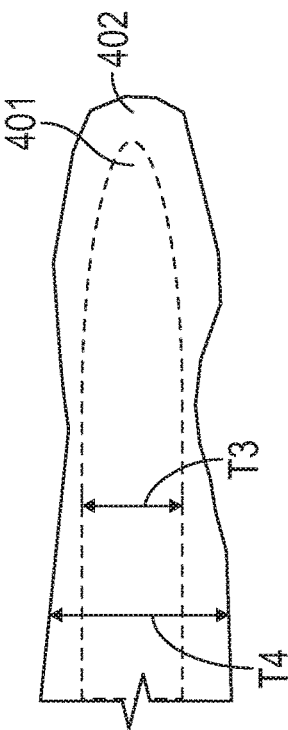
FIG. 3 is a schematic axial view of a trailing edge of a casting in accordance with embodiments.

With reference to FIG. 3 and in accordance with embodiments, one of the multiple portions of the nominal turbine airfoil casting is a trailing edge 301 thereof and one of the desired dimensions is a thickness T1 thereof and one of the multiple portions of each of the multiple actual turbine airfoil castings is a trailing edge 302 thereof and one of the actual dimensions is a thickness T2 thereof. Here, the thickness T2 of the trailing edge 302 of each of the multiple actual turbine airfoil castings is at least one of thicker than and offset from the trailing edge 301 of the nominal turbine airfoil casting.

Figure 4:
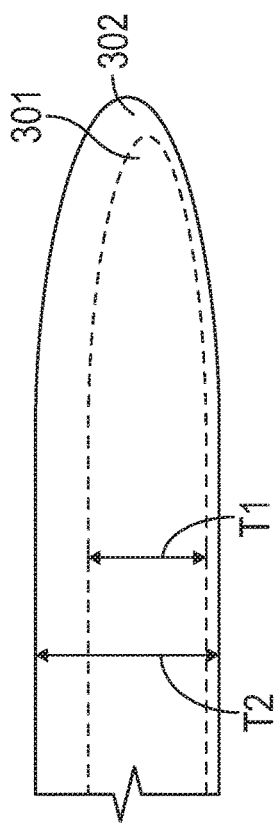
FIG. 4 is a schematic axial view of a trailing edge of a casting in accordance with embodiments.

With reference to FIG. 4 and in accordance with embodiments, one of the multiple portions of the nominal turbine airfoil casting is a trailing edge 401 thereof wherein one of the desired dimensions is a thickness T3 thereof. However, one of the multiple portions of each of the multiple actual turbine airfoil castings is an irregular trailing edge 402 thereof and one of the actual dimensions is a thickness T4 thereof. Here, the thickness T4 of the irregular trailing edge 402 of each of the multiple actual turbine airfoil castings is thicker than the trailing edge 401 of the nominal turbine airfoil casting.

Figure 5:
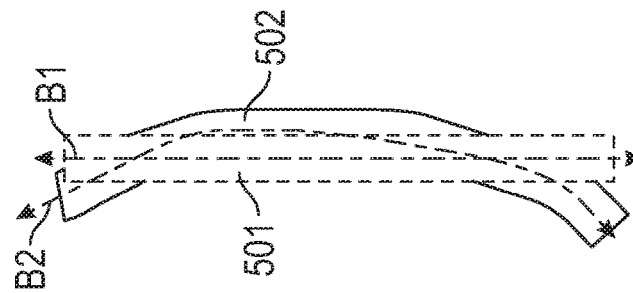
FIG. 5 is a schematic axial view of a trailing edge of a casting in accordance with embodiments.
Figure 6:
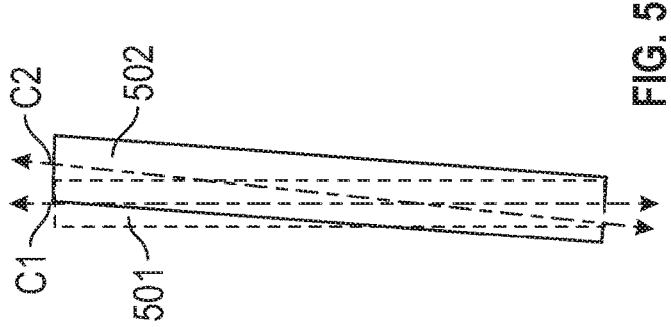
FIG. 6 is a schematic axial view of a trailing edge of a casting in accordance with embodiments.

With reference to FIGS. 5 and 6 and in accordance with embodiments, one of the multiple portions of the nominal turbine airfoil casting is a trailing edge 501 thereof wherein one of the desired dimensions is at least one of a degree of canting C1 (see FIG. 5) and an amount bowing B1 (see FIG.

6) thereof. However, one of the multiple portions of each of the multiple actual turbine airfoil castings is a trailing edge 502 thereof and one of the actual dimensions is at least one of a degree of canting C2 (see FIG. 5) and an amount of bowing B2 (see FIG. 6) thereof. Here, the at least one of the degree of the canting C2 and the amount of the bowing B2 of the trailing edge 502 of each of the multiple actual turbine airfoil castings differs from the at least one of the degree of the canting C1 and the amount of the bowing B1 of the trailing edge 501 of the nominal turbine airfoil casting.

In each case described above, the difference between the actual dimensions of each of the multiple actual turbine airfoil castings and the nominal turbine airfoil casting is provided such that the one or more tools can be subsequently engaged to thereby adaptively machine each of the multiple actual turbine airfoil castings to reduce the respective differences between the actual dimensions of each of the multiple actual turbine airfoil castings and the desired dimensions. More particularly, to the extent that the respective actual dimensions of each of the multiple actual turbine airfoil castings exceed the desired dimensions, a cutting tool can be engaged to reduce the actual dimensions (i.e., the cutting tool can remove material from a thickened trailing edge to thin the trailing edge and to blend the thinned trailing edge into the rest of the turbine airfoil) as illustrated by operation 2031 of FIG. 1. On the other hand, to the extent that the respective actual dimensions of each of the multiple actual turbine airfoil castings are less than the desired dimensions, an additive manufacturing tool can be engaged to increase the actual dimensions (i.e., the additive manufacturing tool can add surface features to a trailing edge that cannot be reliably casted) as illustrated by operation 2032 of FIG. 1.

Figure 7:
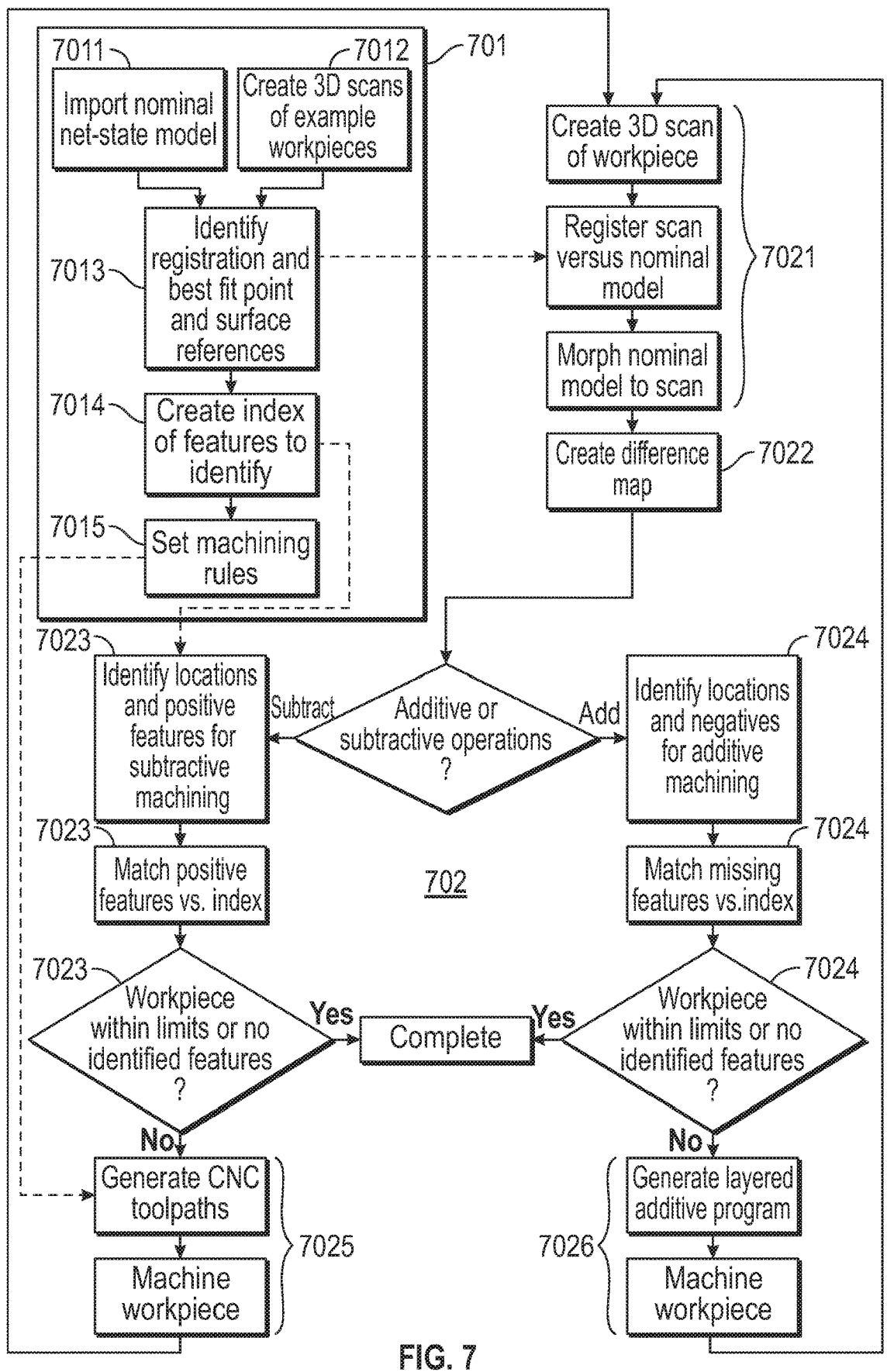
FIG. 7 is a flow diagram illustrating operations of one or more tools used in the method of FIG. 2 in accordance with embodiments.

With reference to FIG. 7, further details of the step of engaging 203 the one or more tools will now be described. As shown in FIG. 7, the step of engaging the one or more tools without rigidly-programmed toolpaths generally includes preparing the one or more tools for executions of adaptive machining 701 and executing the adaptive machining in accordance with operation 702.

In accordance with embodiments, the step of preparing the one or more tools of operation 701 includes at least one of importing net-state models of the nominal turbine airfoil casting and creating three-dimensional scans of exemplary workpieces 7011 and 7012, respectively, identifying registration, best-fit point and surface references 7013, creating an index of features to identify 7014 and setting the adaptive machining rules 7015.

In accordance with further embodiments, the step of executing the adaptive machining of operation 702 includes scanning each of the multiple actual turbine airfoil castings 7021, creating difference maps between the nominal turbine airfoil casting and each of the multiple actual turbine airfoil castings in accordance with the registration, best-fit point and surface references 7022, defining subtractive or additive operations relative to each of the multiple actual turbine airfoil castings in accordance with the index of features 7023 and 7024, respectively, and programming the one or more tools to execute the subtractive or additive operations in accordance with the adaptive machining rules 7025 and 7026, respectively.

The step of scanning each of the multiple actual turbine airfoil castings of operation 7021 can include of the steps of creating a three-dimensional scan of a workpiece, registering the scan versus a nominal model using the registration, best-fit point and surface references identified in operation 7013 and morphing the nominal model to the scan. The step of defining the subtractive operations of operation 7023 can include the steps of identifying locations and positive features for subtractive machining using the index created in operation 7014, matching the locations and the positive features versus the index, and determining whether the workpiece is already within limits or possesses no identified positive features.

The step of defining the additive operations of operation 7024 can include of the steps of identifying locations and negative features for additive machining using the index created in operation 7014, matching the locations and the negative/missing features versus the index, and determining whether the workpiece is already within limits or possesses no identified negative features. The step of programming the one or more tools of operations 7025 and 7026 can include a generation of toolpaths and an execution of a machining operation for the subtractive operations and a generation of a layered additive program and an execution of a machining operation for the additive operations.

Figure 8:
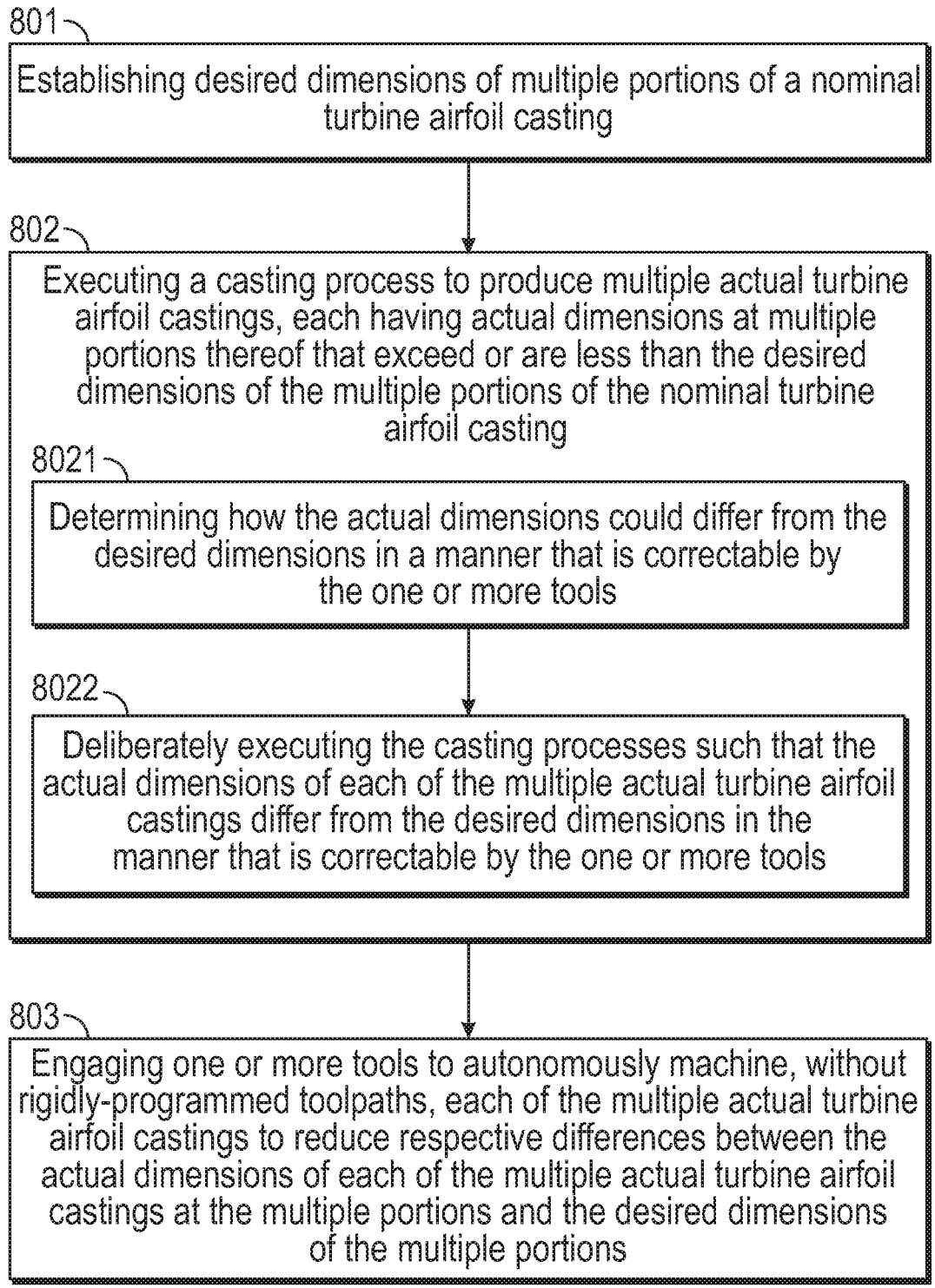
FIG. 8 is a flow diagram illustrating a method of manufacturing a thin-walled casting in accordance with further embodiments.

With reference to FIG. 8, a further method of manufacturing a thin-walled casting is provided. The method includes establishing desired dimensions of multiple portions of a nominal turbine airfoil casting 801. The method further includes executing casting processes to produce multiple actual turbine airfoil castings where each of the multiple actual turbine airfoil castings has actual dimensions at multiple portions thereof that exceed or are less than the desired dimensions of the multiple portions of the nominal turbine airfoil casting 802. In addition, the method includes engaging one or more tools to adaptively machine each of the multiple actual turbine airfoil castings to reduce respective differences between the actual dimensions of each of the multiple actual turbine airfoil castings at the multiple portions and the desired dimensions of the multiple portions 803.

The step of executing operation 802 includes determining how the actual dimensions of each of the multiple actual turbine airfoil castings could differ from the desired dimensions in a manner that is correctable by the one or more tools 8021 and deliberately executing the casting processes such that the actual dimensions of each of the multiple actual turbine airfoil castings differ from the desired dimensions in the manner that is correctable by the one or more tools 8022. In these or other cases, each of the multiple actual turbine airfoil castings is casted in operation 802 such that it ultimately has dimensions which are intentionally provided to exceed or to be less than desired dimensions. This can be done for various reasons including, but not limited to, improving results and reliability of the casting processes by increasing sizes of the product being casted or by leaving negative features that can be used as a reference point for additive manufacturing.

In accordance with further embodiments, examples of intentionally miscasted features will now be described with reference to FIGS. 9-11. In each case, it will be understood that, in conventional casting situations, a typical stock allowance for nominal grinding at root/tip and other locations for various turbine components varies. For a turbine blade, for example, the deepest sections of the root can have a typical stock allowance for nominal grinding between about 0.100" to about 0.209", the shallower sections of the root near the platform can have a typical stock allowance for nominal grinding between about 0.061" to about 0.075", the platform can have a typical stock allowance for nominal grinding between about 0.060" to about 0.080" near the axial ends of the platform to about 0.209" and between about 0.080" to about 0.100" at the areas of the platform near the airfoil and the airfoil itself can have a typical stock allowance for nominal grinding up to about 0.180″ at the tip.

Figure 9B:
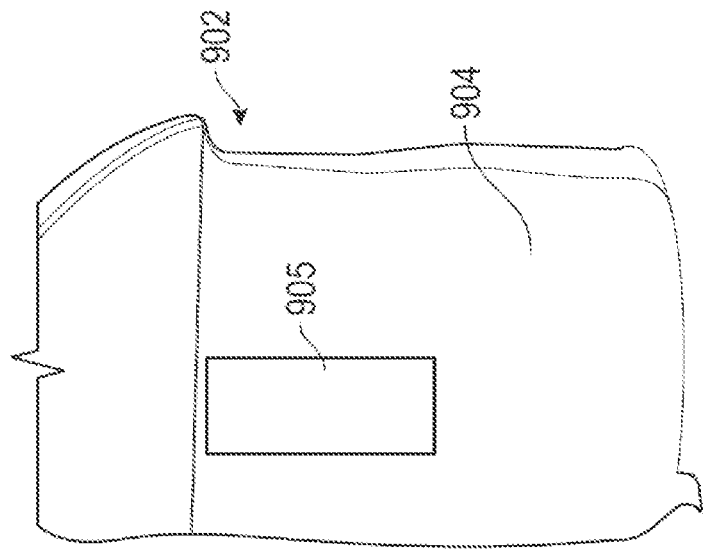
FIGS. 9A and 9B are perspective views of intentionally miscast features of a turbine blade in accordance with embodiments.
Figure 9A:
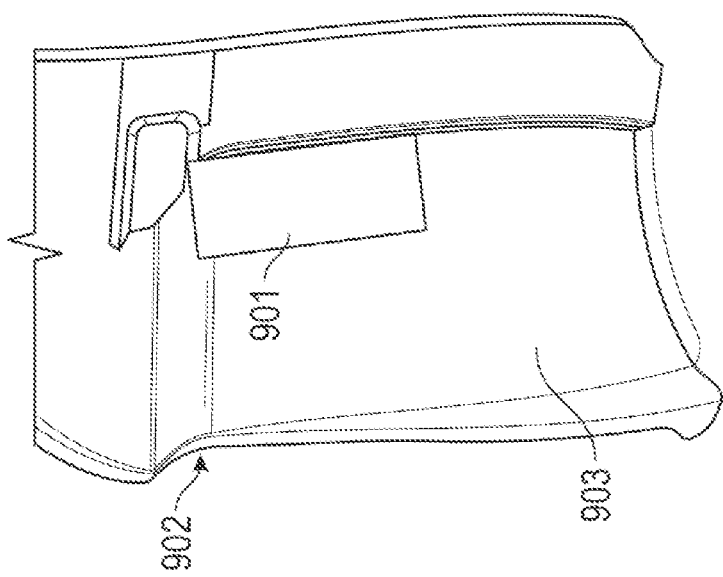

As shown in FIGS. 9A and 9B, an intentionally miscast patch 901 can be added to a cast of a turbine blade 902 near the tip at either or both of the pressure side 903 and the suction side 904 whereas an intentionally miscast recess 905 can also be formed into the cast of the turbine blade 902 near the tip at either or both of the suction side 904 and the pressure side 903. Dimensions of the intentionally miscast patch 901 and the intentionally miscast recess 905 can exceed the typical stock allowances for nominal grinding to accommodate the expected variability in casting processes and also to allow for and facilitate particular corrections of the ultimately casted products. The intentionally miscast patch 901, in particular, can provide for extra material that can be subsequently grinded into the airfoil shape whereby discharge holes, which are formed along the trailing edge but typically drift from a centerline of the turbine blade 902 due to casting variability, can be moved toward the centerline.

Figure 10:
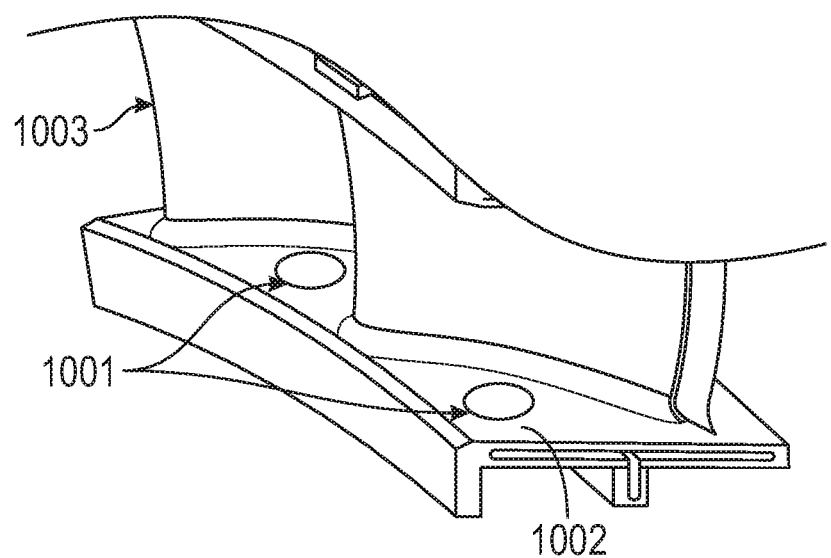
FIG. 10 is a perspective view of an intentionally miscast feature of a turbine vane assembly in accordance with embodiments.

As shown in FIG. 10, an intentionally miscast patch 1001 can be added to a gas path facing surface of a platform section 1002 of a turbine vane assembly 1003. Here again, dimensions of the intentionally miscast patch 1001 can exceed the typical stock allowances for nominal grinding to accommodate the expected variability in casting processes and also to allow for and facilitate particular corrections of the ultimately casted products. The intentionally miscast patch 1001 can provide for extra material that can be subsequently grinded but which can prevent or avoid thinning and puckering of the proximal features.

Figure 11:
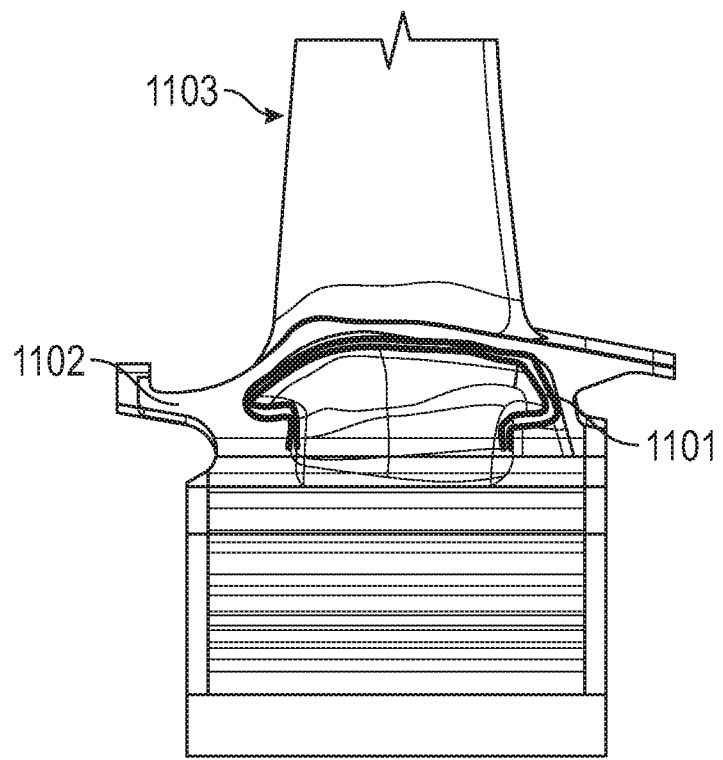
FIG. 11 is a perspective view of an intentionally miscast feature of an underside of a platform of a turbine blade in accordance with embodiments.

As shown in FIG. 11, an intentionally miscast patch 1101 can be added to a non-gas path facing surface of an underside of a platform section 1102 of a turbine blade 1103. Here again, dimensions of the intentionally miscast patch 1101 can exceed the typical stock allowances for nominal grinding to accommodate the expected variability in casting processes and also to allow for and facilitate particular corrections of the ultimately casted products. The intentionally miscast patch 1101 can provide for extra material that can be subsequently grinded but which can support webbing used to bridge the gap between seals between adjacent blades.

Benefits of the features described herein are an allowance for thicker wax walls, which helps to diminish deformation after injection and during shelling (wax reformers are commonplace for larger industrial blades for this reason). In addition, the features described herein provide for a mitigation of breakage and damage during shelling as well as a reduction in the number and size of flow lines and voids by thicker wax walls. Also, the features provide for an avoidance of filling of thin wall sections during pouring, which can result in a non-fill condition, and a mitigation of pressure-driven effects that, in thin walls, tend to induce kiss-out between the core and shell. Still further benefits of the features described herein are an allowance of the use of printed waxes, which would otherwise have limitations on lower end of section thickness, an improvement in heat transfer performance by reducing wall thickness in certain locations, a reduction in part weight and/or pull by reducing wall thickness in certain locations and an improvement in aerodynamic performance by improving part-to-part variability.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a casting, the method comprising:
    establishing desired dimensions of a nominal casting;
    executing a casting process to produce multiple actual castings with each of the multiple actual castings having respective dimensions that differ from each other and from the desired dimensions of the nominal casting; and
    engaging one or more tools to adaptively machine, without rigidly-programmed toolpaths, each of the multiple actual castings to reduce the respective differences between the actual dimensions of each of the multiple actual castings and the desired dimensions,
    wherein:
    actual dimensions of each of the multiple castings exceed or are less than the desired dimensions and the engaging of the one or more tools, without rigidly-programmed toolpaths, comprises engaging a cutting tool to reduce the actual dimensions of each of the multiple actual castings exceeding the desired dimensions and engaging an additive manufacturing tool to increase the actual dimensions of each of the multiple castings that are less than the desired dimensions, and
    the engaging of the cutting tool and the additive manufacturing tool comprises preparing by importing netstate models of the nominal casting and creating three-dimensional scans of exemplary workpieces, identifying registration, best-fit point and surface references, creating an index of features to identify and setting adaptive machining rules.

2. The method according to claim 1, wherein the nominal casting has a size and shape of a turbine airfoil and each of the multiple actual castings has a trailing edge which is at least one of thicker than and offset from a trailing edge of the nominal casting.

3. The method according to claim 1, wherein the nominal casting has a size and shape of a turbine airfoil and each of the multiple actual castings has an irregular trailing edge which is thicker than a trailing edge of the nominal casting.

4. The method according to claim 1, wherein the nominal casting has a size and shape of a turbine airfoil and each of the multiple actual castings has a trailing edge which is at least one of canted and bowed as compared to a trailing edge of the nominal casting.

5. The method according to claim 1, wherein the executing of the adaptive machining comprises:
scanning each of the multiple actual castings;
creating difference maps between the nominal casting and each of the multiple actual castings in accordance with the registration, best-fit point and surface references;
defining subtractive and additive operations relative to each of the multiple actual castings in accordance with the index of features; and
programming the one or more tools to execute the subtractive and additive operations in accordance with the adaptive machining rules.

6. The method according to claim 1, wherein the executing of the adaptive machining is deliberately executed such that the actual dimensions of each of the multiple castings differ from the desired dimensions in a manner that is correctable by the one or more tools.

7. A computer-implemented method of manufacturing a casting, the method comprising:
establishing desired dimensions of multiple portions of a nominal turbine airfoil casting;
executing a casting process to produce multiple actual turbine airfoil castings, each of the multiple actual turbine airfoil castings having respective actual dimensions at multiple portions thereof that exceed or are less than the desired dimensions of the multiple portions of the nominal turbine airfoil casting; and
engaging one or more tools to adaptively machine, without rigidly-programmed toolpaths, each of the multiple actual turbine airfoil castings to reduce the respective differences between the actual dimensions at the multiple portions of each of the multiple actual turbine airfoil castings and the desired dimensions of the multiple portions,
wherein:
actual dimensions of each of the multiple castings exceed or are less than the desired dimensions and the engaging of the one or more tools, without rigidly-programmed toolpaths, comprises engaging a cutting tool to reduce the actual dimensions of each of the multiple actual castings exceeding the desired dimensions and engaging an additive manufacturing tool to increase the actual dimensions of each of the multiple castings that are less than the desired dimensions, and
the engaging of the cutting tool and the additive manufacturing tool comprises preparing by importing net-state models of the nominal casting and creating three-dimensional scans of exemplary workpieces, identifying registration, best-fit point and surface references, creating an index of features to identify and setting adaptive machining rules.

8. The computer-implemented method according to claim 7, wherein:
one of the multiple portions of the nominal turbine airfoil casting is a trailing edge thereof and one of the desired dimensions is a thickness thereof,
one of the multiple portions of each of the multiple actual turbine airfoil castings is a trailing edge thereof and one of the actual dimensions is a thickness thereof, and
the thickness of the trailing edge of each of the multiple actual turbine airfoil castings is at least one of thicker than and offset from the trailing edge of the nominal turbine airfoil casting.

9. The computer-implemented method according to claim 7, wherein:
one of the multiple portions of the nominal turbine airfoil casting is a trailing edge thereof and one of the desired dimensions is a thickness thereof,
one of the multiple portions of each of the multiple actual turbine airfoil castings is an irregular trailing edge thereof and one of the actual dimensions is a thickness thereof, and
the thickness of the irregular trailing edge of each of the multiple actual turbine airfoil castings is thicker than the trailing edge of the nominal turbine airfoil casting.

10. The computer-implemented method according to claim 7, wherein:
one of the multiple portions of the nominal turbine airfoil casting is a trailing edge thereof and one of the desired dimensions is at least one of a canting and bowing thereof,
one of the multiple portions of each of the multiple actual turbine airfoil castings is a trailing edge thereof and one of the actual dimensions is at least one of a canting and a bowing thereof, and
the at least one of the canting and the bowing of the trailing edge of each of the multiple actual turbine airfoil castings differs from the at least one of the canting and the bowing of the trailing edge of the nominal turbine airfoil casting.

11. The computer-implemented method according to claim 7, wherein the executing of the adaptive machining comprises:
scanning each of the multiple actual turbine airfoil castings;
creating difference maps between the nominal turbine airfoil casting and each of the multiple actual turbine airfoil castings in accordance with the registration, best-fit point and surface references;
defining subtractive and additive operations relative to each of the multiple actual turbine airfoil castings in accordance with the index of features; and
programming the one or more tools to execute the subtractive and additive operations in accordance with the adaptive machining rules.

12. The computer-implemented method according to claim 7, wherein the executing of the adaptive machining is deliberately executed such that the actual dimensions of each of the multiple actual turbine airfoil castings differ from the desired dimensions in a manner that is correctable by the one or more tools.

13. A computer-implemented method of manufacturing a casting, the method comprising:
establishing desired dimensions of multiple portions of a nominal turbine airfoil casting;
executing casting processes to produce multiple actual turbine airfoil castings, each of the multiple actual turbine airfoil castings having respective actual dimensions at multiple portions thereof that exceed or are less than the desired dimensions of the multiple portions of the nominal turbine airfoil casting; and
engaging one or more tools to adaptively machine, without rigidly-programmed toolpaths, the multiple actual turbine airfoil castings to reduce the respective differences between the actual dimensions of each of the multiple actual turbine airfoil castings at the multiple portions and the desired dimensions of the multiple portions, wherein the executing comprises:

determining how the actual dimensions of each of the multiple actual turbine airfoil castings could differ from the desired dimensions in a manner that is correctable by the one or more tools;

deliberately executing the casting processes of each of the multiple actual turbine airfoil castings such that the actual dimensions of each of the multiple actual turbine airfoil castings differ from the desired dimensions in the manner that is correctable by the one or more tools; and engaging cutting and additive manufacturing tools to decrease a difference between the actual dimensions of each of the multiple actual turbine airfoil castings and the desired dimensions, wherein the engaging of the cutting and additive manufacturing tools comprises preparing by importing net-state models of the nominal casting and creating three-dimensional scans of exemplary workpieces, identifying registration, best-fit point and surface references, creating an index of features to identify and setting adaptive machining rules.

* * * * *